C. W. HERING.
SPEED TRANSMISSION GEARING.
APPLICATION FILED JUNE 7, 1909.
980,948.
Patented Jan. 10, 1911.
3 SHEETS—SHEET 1.
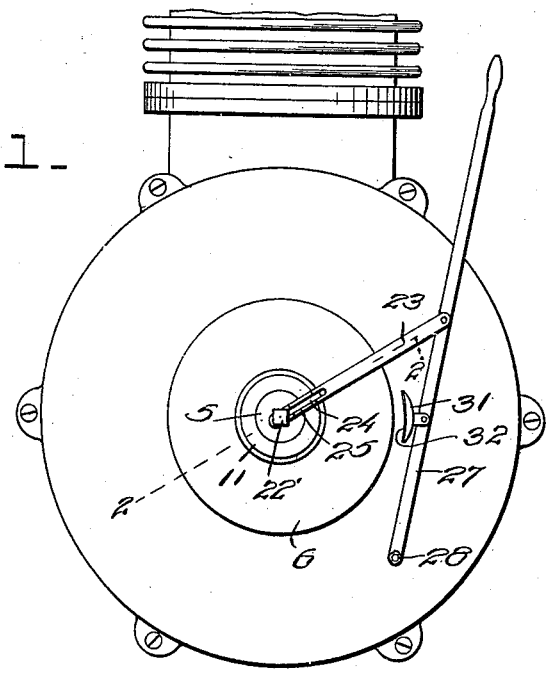
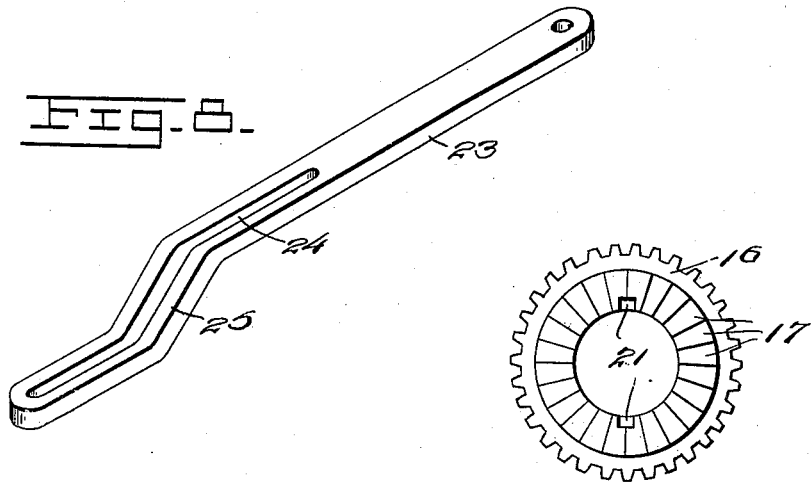
Inventor
C. W. Hering, C. W. HERING.
SPEED TRANSMISSION GEARING.
APPLICATION FILED JUNE 7, 1909.
980,948.
Patented Jan. 10, 1911.
3 SHEETS—SHEET 2.
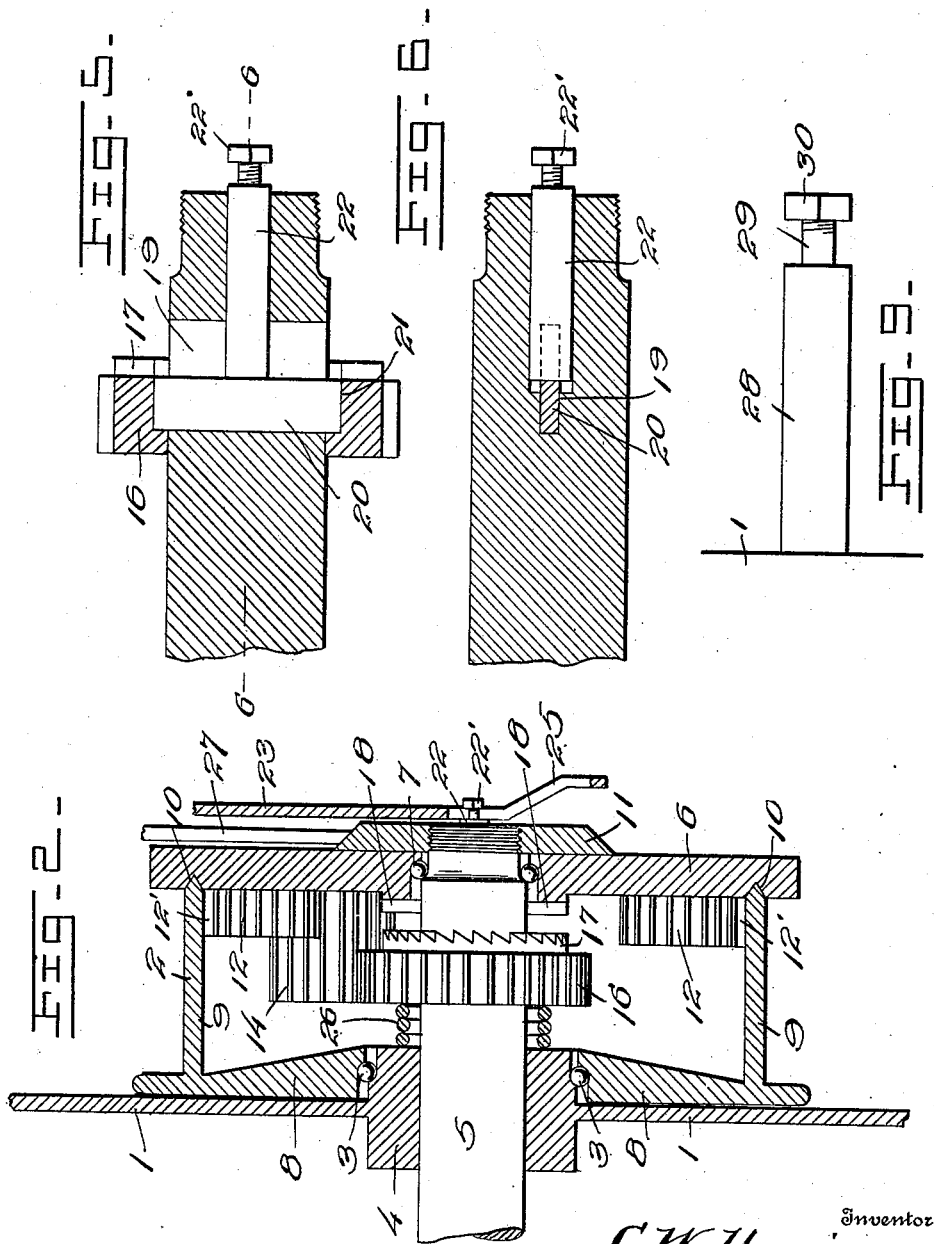

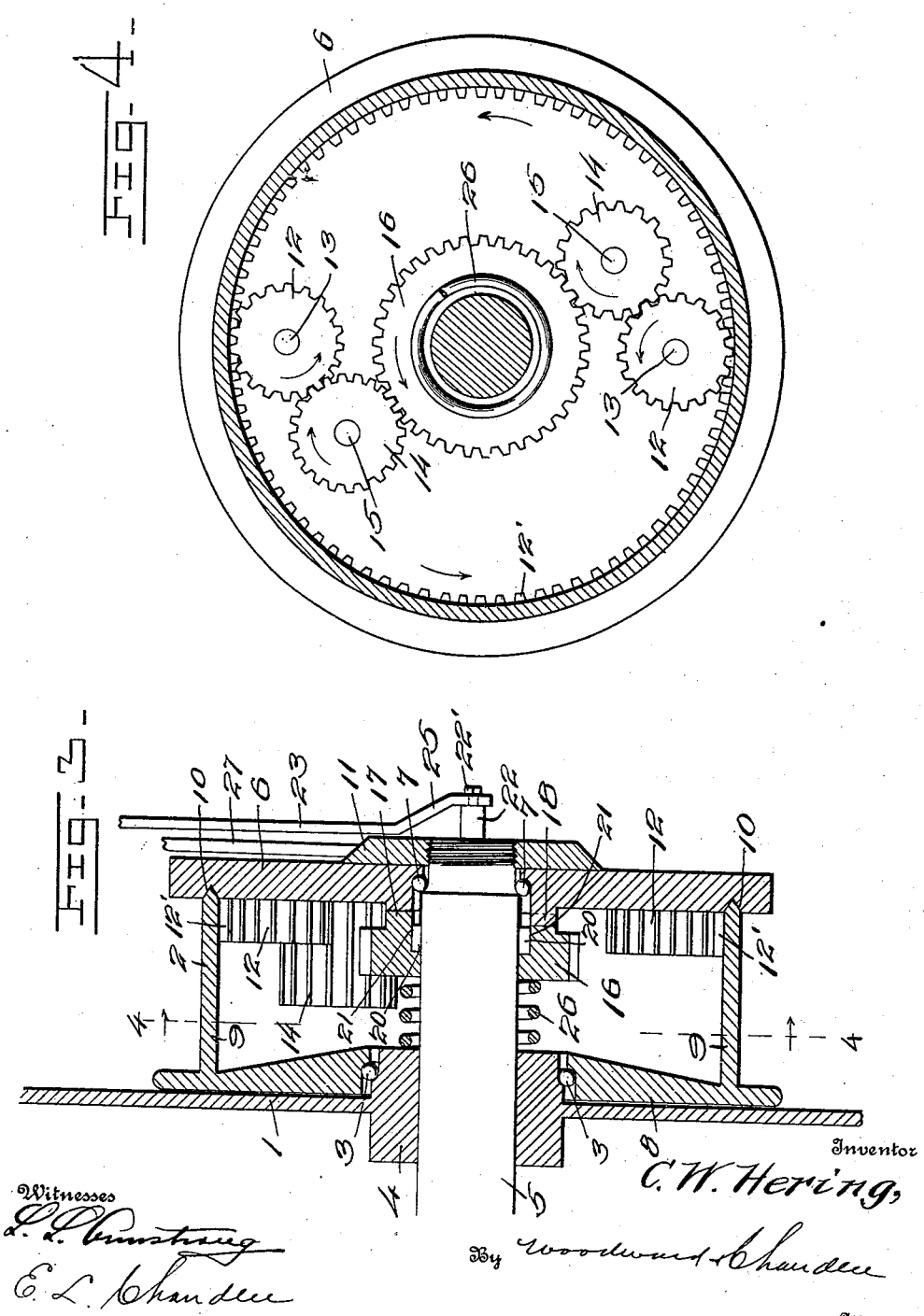

UNITED STATES PATENT OFFICE.

CHARLES W. HERING, OF LOS ANGELES, CALIFORNIA.

SPEED-TRANSMISSION GEARING.

980,948.

Specification of Letters Patent. Patented Jan. 10, 1911.

Application filed June 7, 1909. Serial No. 500,618.

*To all whom it may concern:*

Be it known that I, CHARLES W. HERING, a citizen of the United States, residing at Los Angeles, in the county of Los Angeles and State of California, have invented certain new and useful Improvements in Speed-Transmission Gearing, of which the following is a specification.

This invention relates to new and useful improvements in transmission gearing, and is particularly designed for use in connection with the band pulley as commonly used upon automobiles, motor cycles and like self-propelled vehicles.

Objects of my invention are to provide a suitable means by which two distinct speeds may be had, and means by which the speed of the pulley may be instantaneously changed as desired.

A further object is to provide a suitable clutch gear, adapted to engage said internal gears, and mounted upon the engine shaft whereby the same may be instantly adjusted into or out of engagement with clutch teeth formed upon the rotary side plate of the pulley.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings, Figure 1 is a side elevation of my improved device showing the means for operating the same. Fig. 2 is an enlarged sectional view taken on line 2—2 of Fig. 1. Fig. 3 is a similar view, illustrating the position of the clutch gear with relation to the internal gears when the pulley is being operated at full speed. Fig. 4 is a vertical section taken on the line 4—4 of Fig. 3. Fig. 5 is an enlarged section of the outer end of the engine shaft showing the means employed to adjust the clutch gear thereon. Fig. 6 is a section on the line 6—6 of Fig. 5. Fig. 7 is a detail view of the sliding clutch gear. Fig. 8 is a detail view of the shifting rod. Fig. 9 is a detail view of the operating lever supporting rod.

Referring to the drawings, 1 indicates an engine casing of any ordinary or approved construction, and 2 the sprocket or band pulley, mounted upon the ball bearings 3 located in the periphery of a central enlargement 4 formed integral with the side of the engine casing, and in which the shaft 5 of the engine is journaled. On the outer end of the shaft a pinion plate or intermediate member 6 is mounted upon the ball bearings 7 disposed in a suitable raceway formed in the periphery of the shaft. A plate 8 is mounted upon the bearings 3, and with the integral annular band plate 9 forms the pulley 2. The edge of the annular plate 9 is substantially V-shaped and is disposed in a similarly shaped recess 10 in the inner face of the pinion plate 6. The extremity of the shaft 5 is threaded, and a clamping nut or washer 11 is engaged thereon, and securely retains the pulley in position upon the shaft. The pinions 12 are rotatively mounted upon the inner surface of the plate 6, on the stud bolts 13 and are meshed with the pinions 14, also mounted upon the plate 6 on the studbolts 15. These pairs of pinions are disposed at diametrically opposite points and rotary movement is imparted to the same through the clutch gear 16, slidably splined upon the engine shaft 5. The pinions 12 are also in mesh with a circumferential rack 12' carried upon the annular plate 9 whereby rotary movement may be imparted to the same independently of the plate 6. The gear 16 is provided on its outer face with the clutch teeth 17, which are adapted to engage with similar teeth 18 formed upon the pinion plate, to rotate the same as will be later described.

A longitudinal slot 19 is provided in the engine shaft 5, and a key 20 is disposed therein and projects beyond the periphery of the shaft at the opposite sides thereof, said projecting portions engaging in the recesses 21 in the clutch gear 16. A thrust rod 22 is disposed in an opening in the end of the shaft 5, and is longitudinally movable therein through the medium of a shifting rod 23. A bolt 22' is threaded into the outer end of the thrust rod 22 and extends through a slot 24 in the outer end of the shifting rod 23. This slot 24 is located in the angularly disposed portion 25 of the lower end of the shifting rod, the extreme end of which is disposed in parallel relation with the upper end of the same, as is clearly shown in Fig. 2. The rod or bar 24 is rectangular in section, and the bolt 22' has constant contact with the face thereof. The inner end of the thrust rod 22 is adapted to bear against the sliding key 20 of the gear 16 to move the clutch teeth 17 out of engagement with the clutch teeth 18 formed upon the plate 6. A spiral spring 26 is disposed upon the engine shaft 5 between the clutch gear 16 and the hub or enlargement 4 of the casing, and normally tends to force said gear into engagement with the clutch teeth 18 of the pinion plate. The upper end of the shifting bar 23 is pivoted to a suitable operating lever 27, the lower end of which is pivoted to the engine casing. A rod 28 is threaded into the engine casing, and projects outward therefrom and has its extremity reduced as at 29 which is also threaded to receive the clamping nut 30. Between the shoulder formed by the reduced portion of the rod 28 and the nut 30, the end of the lever 27 is disposed. A brake shoe 31 carried by the lever 27 is provided with a concave surface and has frictional engagement with the periphery of the pinion plate 6. The contacting surface of the brake shoe is provided with a leather facing 32, or other suitable material adapted to gradually check rotation of the pinion plate when brought into contact therewith.

A band may be engaged around the pulley, whereby the power derived from the engine may be taken therefrom and utilized in any desired manner. However, as alternatives a sprocket wheel may be secured upon the periphery of the pulley, or the same may be provided with a peripheral groove or trough to receive a leather thong such as is usually employed upon motor cycles.

It will be noted that the clutch gear 16 is at all times in mesh with the pinions 14, whereby rotary movement may be imparted to the pulley through the medium of the pinions 12 meshing with the internal rack formed thereon. When the clutch teeth 17 and 18 are engaged the gears and pinions 14 and 12 are locked to the annular plate 9 and the pulley revolves at full speed. When the lever 27 is operated to disengage the clutch teeth, if resistance is offered to the rotation of the pulley 2, the plate 6 will be rotated rearwardly until stopped by the brake 31, when the gear 12′ will be rotated in a common direction with the gear 16 at a speed governed by the difference in the number of teeth on each, this movement being produced by the meshed pinions rotating upon stationary axes.

In operation, presuming that the parts are in the position shown in Fig. 3, wherein the clutch teeth are engaged and the pulley is being revolved at high speed, when it is desired to reduce the speed, the operator will throw back the lever 27 which will force the thrust rod 22 inwardly as shown in Fig. 2 through the medium of the bolt 22′, the head of which will travel up the inclined surface 25 of the shifting bar 23. Immediately upon the clutch teeth becoming disengaged and the brake shoe 31 engaging with the plate 6, rotary movement will be imparted to the plate 9, through the medium of the pinions 14 and 12. As the thrust rod 22 engages the sliding gear key 20 the clutch gear 16 will be moved inwardly upon the engine shaft 5 and freed from the plate 6. Upon the continued operation of the lever 27 and rearward movement of the clutch gear 16, the brake 31 will be brought into contact with the periphery of the plate 6 and the rotation of the same will be stopped. Rotary movement will now be imparted through the pinions 14 and 12 to the internal gear 12′ and the pulley. This movement will be in the same direction as that of the engine shaft at a considerably reduced speed owing to the interposition of the gears and the pinions 12 and 14. When it is again desired to increase the speed of rotation it is only necessary to throw the lever forward thus drawing the thrust rod outwardly, whereupon the spiral spring 26 will of course force the clutch gear 16 outwardly into engagement with the clutch teeth 18 upon the plate 6, which will lock the transmission elements in fixed relation with the engine shaft. It will be obvious, of course, that the same action would take place, when the rotation of the engine shaft is reversed, the rotation of the plates 6 and 9 all being in the reverse direction to that indicated by the arrows in Fig. 4 of the drawings.

From the foregoing it will be noted that I have provided a speed regulator and transmission gearing which is extremely simple in its construction and operation, while at the same time it is absolutely positive in its action. The reduction of the speed of the pulley is also attained with a minimum loss of power. By providing a ball bearing for the various parts of the pulley the friction induced thereby is also greatly reduced, making the device highly durable in operation.

It will, of course, be understood that my improved transmitting mechanism, as above described, may be advantageously employed upon engines of various makes, including gas engines, electric engines, etc. The device is especially adapted, however, for use in connection with motor cycle engines. The device is, moreover, compactly arranged and all the parts thereof are thoroughly protected from dust and dirt so that there is but little liability of the operation of the various parts being interfered with in any way. There are no delicate parts required in its construction and the cost of repairs is, therefore, extremely small, while the device may be very inexpensively manufactured and quickly assembled into operative position.

What is claimed is:

1. In a speed transmission gearing, the combination with an engine shaft and casing; of a pulley member revolubly mounted around said shaft and casing, an intermediate member revoluble around the shaft, coacting means mounted upon said engine shaft and the intermediate member for imparting rotary movement of the shaft to the pulley and means for interrupting the movement of the intermediate member, said coacting means being adapted to be thrown into and out of operation as desired.

2. In a mechanism of the character described, the combination with an engine shaft and casing, of a hollow driver mounted concentrically of said shaft, an intermediate member adjacent thereto, coacting means mounted upon said engine shaft and intermediate member to impart a unitary rotary movement to said driver and intermediate member, means for interrupting the movement of said intermediate member, said means carried by the intermediate member being adapted to coact with the means on the shaft and with the driver to transmit rotary movement to said driver at a reduced speed in a common direction with the shaft.

3. In a mechanism of the character described, the combination with an engine shaft and casing, of spaced circular plates revoluble therearound, one of said plates having an annular portion formed thereon movably engaged with the face of the other plate, a clutch member carried upon said other plate, a clutch gear slidably mounted upon said shaft adapted to engage with the clutch member, an internal rack upon said annular portion, pairs of meshed pinions mounted upon said other plate, one of each being meshed with the rack, the other being adapted to mesh with said clutch gear, means disposed upon said shaft tending to normally lock said clutch gear with the clutch member, means to disengage said clutch elements and brake the said other plate to impart independent rotary movement to said first named plate at a reduced speed.

4. In a mechanism of the character described, the combination with a slotted drive shaft, of a driven wheel member mounted revolubly around said shaft and recessed on one side, and a revoluble plate abutting the wheel over the recess; clutch teeth on the inner face of the plate, a clutch gear disposed upon said shaft for coaction with said clutch teeth at times, a key extending through the slot in the shaft and having its ends engaged with said gear, a resilient means engaging said gear to force said gear into engagement with the clutch teeth, an internal rack carried by said wheel, pairs of meshed pinions carried by the plate, one of said pinions engaging said rack and the other engaging said clutch gear, means for moving said gear longitudinally upon said shaft to disengage the clutch and impart relative rotary movement to said annular plates, and to retard movement of the outer plate.

5. In a mechanism of the character described, the combination with an engine shaft and casing, of a pulley mounted around the shaft, a circular plate revoluble on the shaft adjacent the pulley, an internal gear member carried by the pulley and movably engaging the plate, means for retaining said pulley in position upon said shaft, a slidable gear on the shaft, said shaft having a passage therethrough, a key disposed in said passage and having its ends engaged in the sliding gear, an axial thrust rod longitudinally movable in said shaft, the inner end of said rod being in engagement with said key, a headed projection at the outer end of said rod, a shifting bar provided with a longitudinal slot adapted to receive said projection, a lever pivoted upon the engine casing for operating said bar, a gear train upon the face of the plate for engaging said internal and sliding gears upon movement of the rod, and means on the lever for retarding rotation of the outer plate simultaneously with inward movement of said thrust rod.

6. In a mechanism of the character described, the combination with an engine shaft and casing, of a relatively revoluble pulley and circular plate mounted around said shaft and casing, an internal gear on said pulley, a clutch face carried upon the inner face of the plate, a clutch gear longitudinally movable upon said shaft and adapted to engage said clutch face, a spring disposed between said gear and the engine casing adapted to normally retain the clutch gear in engagement with the clutch face, a thrust rod longitudinally movable in said shaft, said rod being adapted to move said gear out of locking engagement with the clutch face of said plate, a headed bolt carried at the outer end of said thrust rod, a shifting bar having a diagonal portion provided with a longitudinal slot receiving said headed bolt and adapted to move said thrust rod longitudinally of the engine shaft, an operating lever having one end pivoted on the engine casing and connected to the bar and a brake shoe carried by said lever and adapted to engage the periphery of the outer plate, and a gear train carried by said plate engaging said sliding and internal gears.

7. A device of the class described comprising in combination a drive shaft, relatively revoluble members carried therearound, an internal gear carried by one of the members, a gear slidably splined to the shaft, a gear train carried by the other of said revoluble members, and clutch means operable by movement of said sliding gear to lock all of said elements in rigid relation, means for moving said sliding gear and for retarding movement of one of said revoluble members.

8. In a mechanism of the class described, the combination with a drive shaft, of independently revoluble members carried therearound, one of said members carrying an annular inclosing portion and an internal gear, a gear train carried by the other of said members and meshed with said internal gear, a slidable gear splined upon the shaft and engaged by said gear train, means for retarding movement of one of said independently revoluble members, and clutch means operable by movement of said sliding gear carried within said annular portion and adapted to engage one of said independently revoluble members and being connected with the shaft to lock all of said elements in rigid relation, means for sliding said gear, and for operating the retarding means.

9. In a device of the class described, the combination with a drive shaft, of independently revoluble members, a slidable gear upon the shaft, a gear carried by one of said members, a gear train carried by the other of said independently revoluble members and connecting said first mentioned gears, clutch means interposed between the shaft and one of said independently revoluble members, and releasable by movement of said sliding gear, means for reciprocating said sliding gear, and for retarding movement of one of said independently revoluble members.

In testimony whereof I affix my signature, in presence of two witnesses.

CHARLES W. HERING.

Witnesses:
WM. J. NOUMANN,
ERNEST C. GRIFFITH.